US000001222H

United States Statutory Invention Registration [19]

[11] Reg. Number: H1222

Brown et al. [43] Published: Aug. 3, 1993

[54] APPARATUS FOR DETERMINING STICKY BIT VALUE IN ARITHMETIC OPERATIONS

[76] Inventors: Jeffrey D. Brown, 2327 Hawthorn Hills Rd., Rochester, Minn. 55906; Roy R. Faget, 721 36th St. SW., Rochester, Minn. 55902; Scott A. Hilker, 6203 24th Ave. NW., Rochester, Minn. 55901

[21] Appl. No.: 814,934

[22] Filed: Dec. 30, 1991

[51] Int. Cl.[5] ..... G06F 7/38

[52] U.S. Cl. ..... 364/748; 364/745

[58] Field of Search ..... 364/748, 745, 752, 761, 364/764, 765, 754, 757, 715.1

[56] References Cited

U.S. PATENT DOCUMENTS

| | | | |
|---|---|---|---|
| 4,488,247 | 12/1984 | Inagami et al. | 364/765 |
| 4,639,887 | 1/1987 | Farmwald | 364/748 |
| 4,758,972 | 7/1988 | Frazier | 364/745 |
| 4,928,259 | 5/1990 | Galbi et al. | 364/745 |
| 4,994,996 | 2/1991 | Fossum et al. | 364/748 |
| 5,128,889 | 7/1992 | Nakano | 364/748 |

*Primary Examiner*—Donald P. Walsh
*Assistant Examiner*—Ngoclan T. Mai

[57] ABSTRACT

An apparatus for determining the correct value to be assigned to the "sticky-bit" (S) position as a consequence of an arithmetic floating point multiply, divide or square root operation. The apparatus measures the number of trailing zeroes in the operand registers, performs a sum or difference calculation of these values, and compares the result with a third value to determine the sticky-bit value.

9 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR DETERMINING STICKY BIT VALUE IN ARITHMETIC OPERATIONS

BACKGROUND OF THE INVENTION

The present invention relates to an apparatus for performing certain floating point arithmetic operations in a data processing system. More particularly, the invention relates to an apparatus simplifying the completion of floating point arithmetic operations by processing the operands to form an early determination of the value of the "sticky bit" which appears in the floating point resultant value.

The use of floating point arithmetic operations in a data processing system has been a common practice practically since the inception of computer technology. The development of floating point arithmetic hardware has taken many forms, usually with the objectives of simplifying the hardware construction, or enhancing the speed of the arithmetic processing operation. The four arithmetic operations of add, subtract, multiply and divide have usually been accomplished by using specialized subsets of processes involving addition and subtraction. For example, multiplication operations have in many cases been performed by repeated addition processes, and division has been accomplished by a process of repeated subtraction. The efforts made to speed up these processing operations have focused on enhancements and simplifications of hardware circuit design, particularly the adder circuit, which ultimately limits the maximum processing speed of all arithmetic operations. In the case of division, efforts have been made to increase the speed of operation by calculating partial quotients, or by simultaneously predicting multiple quotient bits, to reduce the number of addition or subtraction iterations required for the divide calculation.

An American national standard has been developed in order to provide a uniform system of rules for governing the implementation of floating point arithmetic systems. This standard is identified as ANSI/IEEE Standard No. 754-1985, and is incorporated by reference herein. In the design of floating point arithmetic systems and algorithms, it is a principal objective to achieve results which are consistent with this standard, to enable users of such systems and algorithms to achieve conformity in the calculations and solutions to problems even though the problems are solved using different computer systems. The standard specifies basic and extended floating point number formats, arithmetic operations, conversions between integer and floating point formats, conversions between different floating point formats, conversions between basic format floating point numbers and decimal strings, and the handling of certain floating point exceptions.

The typical floating point arithmetic operation may be accomplished in either single precision or double precision format. Each of these formats utilizes a sign, exponent and fraction field, where the respective fields occupy predefined portions of the floating point number. In the case of a 32-bit single precision number the sign field is a single bit occupying the most significant bit position; the exponent field is an 8-bit quantity occupying the next-most significant bit positions; the fraction field occupies the least significant 23-bit positions. In the case of a double precision floating point number the sign field is a single bit occupying the most significant bit position; the exponent field is an 11-bit field occupying the next-most significant bit positions; the fraction field is a 52-bit field occupying the least significant bit positions.

After each floating point answer is developed, it must be normalized and then rounded. When the answer is normalized, the number of leading zeros in the fraction field is counted. This number is then subtracted from the exponent and the fraction is shifted left until a "1" resides in the most significant bit position of the fraction field.

In designing the hardware and logic for performing floating point arithmetic operations in conformance with ANSI/IEEE Standard 754-1985, it is necessary and desirable to incorporate certain additional indicator bits into the floating point hardware operations. These indicator bits are injected into the fraction field of the floating point number, and are used by the arithmetic control logic to indicate when certain conditions exist in the floating point operation. For example, an "implicit" bit I is set to "1" by the arithmetic control logic when the exponent of the floating point number has a nonzero value. The implicit bit I is created at the time a floating point number is loaded into the arithmetic registers, and the implicit bit I occupies the first bit position in the fraction field of the number. In addition, a "guard" bit G is set by the floating point control logic during certain arithmetic operations, as an indicator of how to round. The G bit occupies a position which is one bit less significant than the least significant bit (LSB) of the result before rounding. Finally, a "sticky" bit S is an indicator bit which is set in all floating point arithmetic operations when any bit of lower precision than the guard (G) bit is a "1," as an indicator that the floating point number has lost some precision.

The extra bits in the fraction field are used exclusively for rounding operations, after the result has been normalized. The guard (G) bit is treated as if it is a part of the fraction; it is shifted with the rest of the fraction, and included in all arithmetic. The sticky (S) bit is not shifted with the fraction, but is included in the arithmetic. It acts as a "catcher" for 1's shifted off the right of the fraction; when a 1 is shifted off the right side of the fraction, the S bit will remain a 1 until normalization and rounding are finished.

In a rounding operation following the IEEE convention, there are four modes of rounding which are used, as follows:

1) round to nearest;
2) round to positive infinity;
3) round to negative infinity;
4) round to zero.

The "round to nearest" mode means that the value nearest to the infinitely precise result should be delivered. If the two nearest representable values are equally near, the one with its least significant bit zero shall be delivered. The "round to positive infinity" mode means that the value closest to and not less than the infinitely precise result should be delivered. The "round to negative infinity" mode means that the value closest to and not greater than the infinitely precise result should be delivered. The "round to zero" mode means that the result delivered should be the closest to but not greater in magnitude than the infinitely precise result.

Unfortunately, any arithmetic circuit utilizing an adder for carrying out an addition or subtraction inevitably involves the generation of carry bits which are propagated from least significant bit positions to more significant bit positions, and can in fact be propagated throughout all bit positions during an arithmetic operation. This has the affect of extending the processing time required for completing a calculation, and various design efforts have been made to deal with this problem. For example, U.S. Pat. No. 4,754,422, issued Jun. 28, 1988, discloses a dividing apparatus utilizing three carry-save adders in an effort to produce a plurality of quotient bits during each iteration or cycle of arithmetic operation. U.S. Pat. No. 3,621,218, issued Nov. 16, 1971, discloses a high-speed divider utilizing a single carry-save adder for producing a plurality of quotient bits during each iteration of the arithmetic operation, and a plurality of registers for holding a sequence of partial quotients used in the operation.

U.S. Pat. No. 4,639,887, issued Jan. 27, 1987, discloses an apparatus for decreasing the latency time associated with floating point addition and subtraction. The invention uses duplicate hardware for the calculation of the arithmetic operation on the fraction portion of a floating point number, and then selects a resultant value based upon exponent differences.

In any floating point operation in a data processing system it is desirable to increase the efficiency of one or more of the floating point operations, for an increase in this efficiency translates directly into a proportionate time savings in systems operation. Certain efficiencies are possible in specialized situations, some of which are illustrated in the foregoing prior art disclosures, and it is important to take advantage of these efficiencies, particularly if the special situations may be encountered relatively frequently during the course of data processing operations. For example, floating point arithmetic calculations frequently require a normalize operation when an answer is developed, and a rounding operation if the answer is inexact. However, either or both of these operations may be skipped when certain result conditions exist, thereby saving the time otherwise required for executing these operations. In floating point multiply operations the normalize and rounding steps can be eliminated approximately 50% of the time, depending upon certain operating conditions, and for floating point addition and subtraction operations the normalize and rounding steps can be eliminated about 25% of the time, depending upon operating conditions. By eliminating these steps when conditions suggest that elimination is possible, an overall savings in computer processing time is achieved.

The states of the guard (G), sticky (S), and the least significant bit (LSB), the resultant sign, and the rounding mode are all used to determine whether or not the LSB should be incremented in order to deliver a correctly-rounded fraction result. The state of the sticky (S) bit must usually be known prior to delivering a final result.

SUMMARY OF THE INVENTION

The present invention provides a method and apparatus for processing the operands to make a determination of the sticky (S) bit, independent of the floating point processing calculation, which may be ongoing simultaneously with the processing according to the teachings of the present invention. The invention utilizes circuitry for detecting the number of trailing zeroes in each of the operands for which a floating point operation is underway. The trailing zero detector logic for each operand is coupled into an adder to produce a sum value and a comparator compares this value against a predetermined value to determine the final value of the sticky bit required for the arithmetic floating point operation. The invention may be used, with some variation, in conjunction with floating point multiply, divide and square root calculations.

It is the principal object and advantage of the present invention to provide an apparatus for determining a resultant sticky bit value simultaneously while floating point computational processes are ongoing.

It is another object and advantage of the present invention to provide a sticky bit value in floating point arithmetic operations, by processing the operands utilized in the operations.

It is another object and advantage of the present invention to increase the speed of overall floating point arithmetic operations.

The foregoing objects and advantages will become apparent from the following specification, and with reference to the claims, and with reference to the drawings.

DESCRIPTION OF THE PREFERRED EMBODIMENT

The present invention is useful for determining the proper sticky bit (S) value for both multiplication and division arithmetic operations. The invention may also be utilized for specialized division operations, such as square root arithmetic operations. The invention will be described hereinafter, first with reference to a multiplication operation, and then with reference to a division operation, and finally with reference to a square root operation. For all operations, the implicit bit (1) is assumed to be a "1."

Multiply Operation

Figure 1:
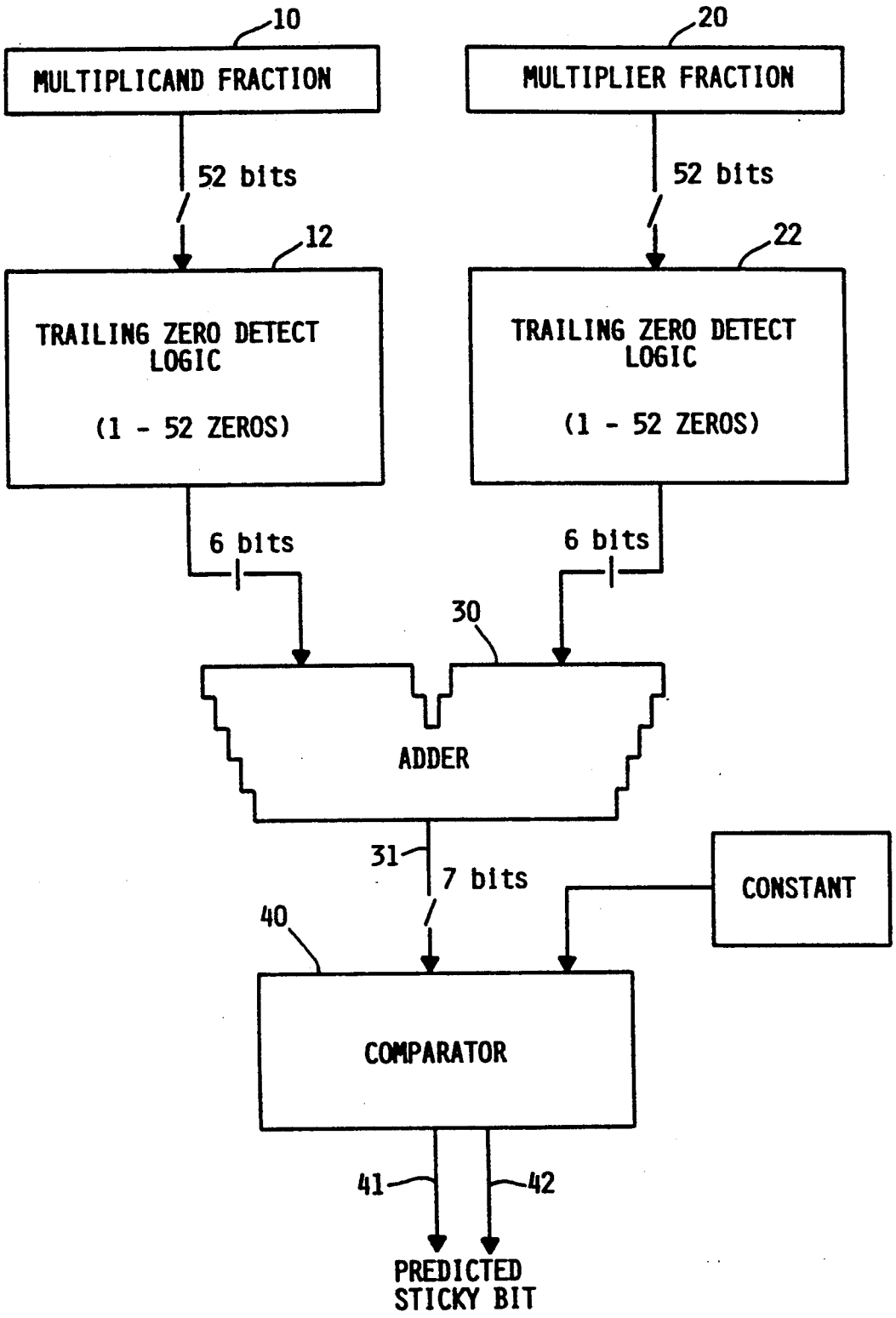
FIG. 1 shows a block diagram of the apparatus for use in multiplication operations.

Referring to FIG. 1, an apparatus is illustrated for practice of the invention in connection with a multiplication operation. The apparatus illustrated operates independently and simultaneously with the circuitry for performing the actual multiplication calculation, and the apparatus produces a sticky bit value which is available simultaneously with the resultant value determined from the multiplication circuitry.

The sticky bit value is calculated by determining the value of trailing zero bits in both the multiplicand and multiplier fraction operands. The number of trailing zero bits in a fraction is a direction measure of the precision of the operand; the precision of the input operands is used to predict the precision of the output fraction, as it would be represented if there were an unlimited number of bit positions. The predicted resultant fraction precision is used to determine the state of the sticky bit. To pre-determine the precision of a product result, it is helpful to first consider the basic premises for multiplication of two binary values. If $L_A$ represents the length of a binary operand A which only encompasses the binary "1" values, all leading and trailing zeroes may be ignored along with the location of the binary point. Therefore, let $L_B$ and $L_C$ represent the length of operands B and C, in the same manner., If we examine the product C for the equation:

$$A \cdot B = C$$

The following relationship may be established:

$$L_A - L_B - 1 \leqq L_C \leqq L_A - L_B$$

The following example illustrates the foregoing equations:

```
Let A =   101011010000.     (L_A = 8)
      B =     .00100111     (L_B = 6)

            1010.1101
           10101.101
          101011.01
         101011010.          <------ leading term

Then C =  110100101.1011    (L_C = 13)
```

The apparatus illustrated in FIG. 1 performs the necessary comparisons and calculations for determining the sticky bit value for the product of any multiplicand fraction and any multiplier fraction. The example illustrates a double precision arithmetic operation, but a similar example would apply to single precision, and single and double extended precision arithmetic operations, since the bit position location of the sticky bit is well known and established for all of these different arithmetic operations.

The multiplicand fraction is held in a register 10, and the multiplier fraction is held in a register 20. Assuming a double precision design, the 52-bits of register 10 are monitored by a trailing zero detector logic circuit 12, which will produce a 6-bit binary output indicative of the number of trailing zeroes detected in circuit 12. Since any number of trailing zeroes may exist, from 1–52, the 6-bit output binary representation is adequate to represent any number of trailing zeroes which may occur. The multiplier fraction held in register 20 is similarly monitored by a trailing zero detector logic circuit 22. Circuit 22 produces a 6-bit binary output value which is indicative of the number of trailing zeroes detected in the multiplier fraction. The binary output values detected by circuits 12 and 22 are connected into an adder circuit 30 which produces the sum of the two inputs at output 31. The sum of two 6-bit input values may produce a 7-bit output value, and output 31 is capable of representing any 7-bit output value which results from the addition operation. Output 31 is coupled into a comparator circuit 40 which compares the output value to a constant numerical value "51," which is connected as the second input into comparator 40. The significance of the comparison relates to the size of the resultant fraction register, and the respective bit positions which have been selected to hold the guard bit (G) and the sticky bit (S). It is well recognized that the multiplication of two 53-bit fractions (including the implicit bit) will produce a 106-bit fractional result if absolute precision is to be maintained. Since it is impractical to design registers and storage locations of a size required for absolute precision, the various special purpose bits described herein have been invented, in order to contain the result in a fraction register size of 53-bits, and at the same time retain a record of the relative precision, or lack of precision, which is produced in a multiply operation. For this reason, the three special purpose bit positions corresponding to the implicit bit (I), the guard bit (G) and the sticky bit (S), have been devised to be carried along with their resultant, and to be developed as a part of the overall multiplication operation. The purposes of these special bits have been hereinbefore described, wherein the implicit (I) bit occupies bit position No. 1 relative to the overall fractional result. The actual resultant fraction occupies bit positions 2–53, i.e., a 52-bit field. The guard bit (G) occupies bit position 54. Comparator 40 determines whether the sum of the two input precisions is less than or equal to the precision measured out to the guard bit position. If the sum of the two input precisions is less than or equal to the precision measured out to the guard bit position, the sticky bit must be equal to zero, which is the value which the multiplication operation will assign to the sticky bit, via a signal on line 41, so the multiplication process will force the sticky bit value to become set equal to zero. If the sum of the two input precisions is greater than the precision measured out to the guard bit position, the value of the sticky bit must be equal to "1," and a signal on line 42 at the output of comparator 40 is used to force the sticky bit value to become equal to a "1."

There is the one case of indefiniteness which must also be considered: this case occurs if the sum of the two input precisions is equal to the precision measured out to the sticky bit position. In this case, the value of the sticky bit is indefinite, since the precision length formula allows for two possible values of product precision, either measured out to the guard bit position or to the sticky bit position. Therefore, in this case the sticky bit may not be predicted by the circuit of FIG. 1, and the value of the sticky bit must be determined by the process of multiplication of the fractions. However, in this case there is no added delay, since there are no bits possible to the right of the sticky bit position; the sticky bit value is therefore simply equal to the value of the bit in the sticky bit position after a possible 1-bit normalization shift, and the circuit permits the sticky bit position value to be determined by the multiplication operation itself, by a signal on line 43.

Divide Operations

One method for performing division of two binary numbers is to use a Newton-Raphson approximation for the reciprocal of the divisor which is then multiplied by the dividend to form the quotient. Each iteration of the Newton-Raphson formula $$X_i + 1 = X_i * (2 - D * X_i),$$

where $X_i$ is the current reciprocal and D is the divisor, produces a next reciprocal, $X_i + 1$, which has twice as many bits of precision as the previous reciprocal. If enough iterations are performed to obtain a final reciprocal with a precision at least as great as that of the final quotient desired, there will still be a possible error of 1-bit in its least significant position because of the way that the formula produces a reciprocal which may not be finitely representable when the quotient is. For example, $$1100/0011 = 0100;$$

however, the reciprocal of 0011 is 0.01010101010101 . . . , which is multiplied by 1100 to produce 0011.11111111111 . . . , which will be 1-bit in error in the least significant position wherever that position is.

The technique described herein with respect to multiply operations may also be used in connection with divide operations. The example given earlier, of using the operand lengths to determine the length of the product for multiplication, can be restated to apply to division to determine the quotient length. A*B=C is the same as C/A=B. For division operations, this leads to the equation $$L_C - L_A \leqq L_B \leqq L_C - L_A + 1$$

In division operations, an exact result will contain the difference in bit lengths ($L_C - L_A$), or the difference in bit lengths plus 1 ($L_C - L_A + 1$). Any other result length produces an inexact result.

Figure 2:
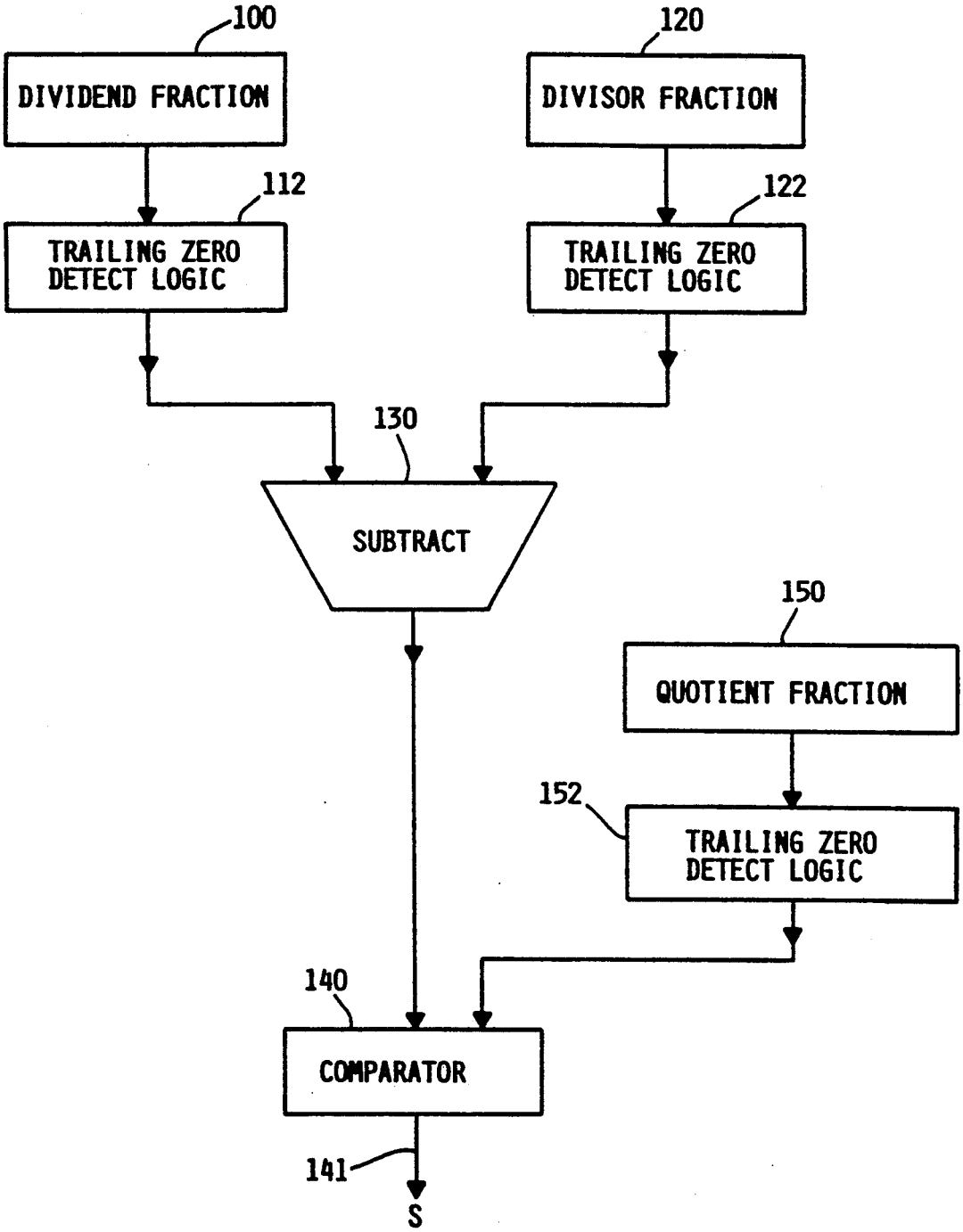
FIG. 2 shows a block diagram of the apparatus for use in division operations.

Referring to FIG. 2, a block diagram of the logic circuits required for predicting the sticky (S) bit for a divide operation is shown. The dividend fraction is held in a register 100, and the divisor fraction is held in a register 120. Register 100 and register 120 are each connected to trailing zero logic detection circuits, register 100 being connected to circuit 112, and register 120 being connected to circuit 122. Each of the trailing zero logic detection circuits produces a binary output value which is indicative of the number of trailing zeros in the respective fractions. The output values from circuits 112 and 122 are connected as inputs into a subtracter circuit 130, which is a two's complement adder, with a constant adjustment of +54; the output from circuit 122 is complemented. The output from subtracter circuit 130 is connected as an input to comparator circuit 140.

After the division operation has been completed, the quotient fraction appears in register 150. Register 150 is connected to trailing zero logic detection circuit 152, which produces a binary output value indicative of the number of trailing zeros in the quotient fraction measured from the guard bit position. The output from circuit 152 is connected as an input to comparator circuit 140. Comparator circuit 140 produces an output which is connected to the sticky bit (S) position in the resultant register; i.e., if comparator 140 determines that the two input values are equal the output "S" on line 141 is zero, and if comparator 140 determines that the two input values are unequal the output "S" on line 141 is "1."

Square Root Operations

A square root arithmetic operation may be thought of as a special case divide operation, wherein the dividend is known and a determination must be made to identify a divisor and quotient having equal values. In this case the "dividend" is referred to as the radicand fraction, and the "divisor" and "quotient" are referred to as "root fractions." Given a radicand fraction which is normalized, the significance of the radicand is the length of the fraction field minus the number of trailing zeros. The square root operation attempts to find a solution to the equation:

$$\text{Radicand (RAD)} = \text{Root}*\text{Root}.$$

The technique described earlier may be used to determine the sticky bit (S) value for square root operations, with only minor modifications. For example, the equation for determining the significant bit lengths reduces to the following:

$$L_{ROOT} = (L_{RAD} - 1)/2, \text{ or}$$

$$L_{ROOT} = L_{RAD}/2; \text{ whichever produces a whole integer.}$$

Since the precision of the radicand is always less than or equal to the maximum fraction field length, the significance of the root can never exceed ½ the fraction field length unless the root is irrational and has infinite length (for example, the square root of 2). Therefore, for all cases where the root significance is not infinite, the sticky bit (S) will be zero and the number of bits of significance $L_{ROOT}$ is determined as shown above. The problem then becomes one of determining when the root will have infinite significance, and thus have a sticky bit (S) of "1."

Figure 3:
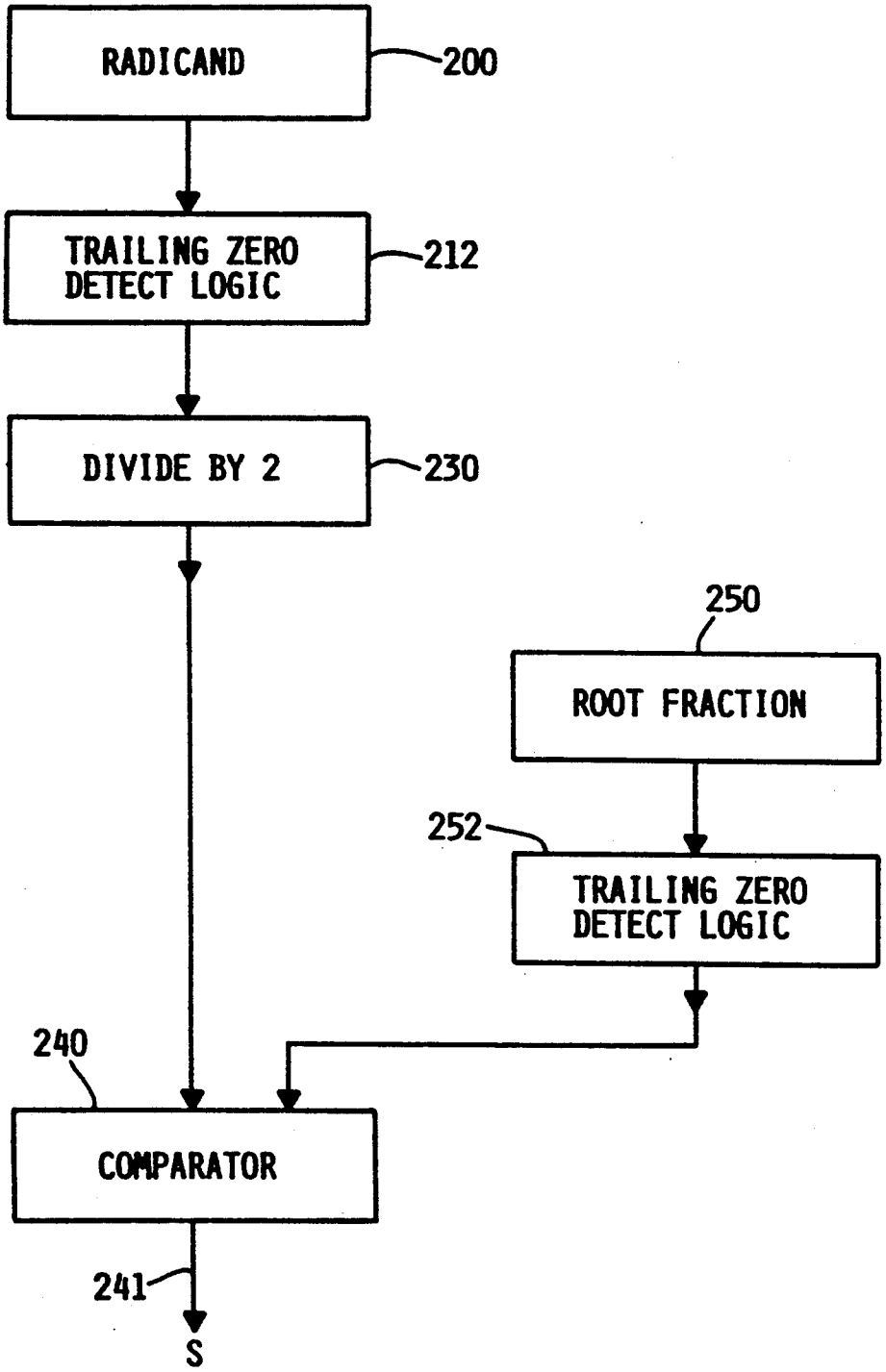
FIG. 3 shows a block diagram of the apparatus for use in square root operations.

FIG. 3 shows a block diagram for determining the sticky bit (S) value in square root operations. The radicand is held in register 200, and register 200 is connected to a trailing zero logic detection circuit 212. Circuit 212 is connected to a "divide by 2" circuit 230, which may merely be a circuit for right shifting the output value by one position, prior to connecting the output value to an input of comparator 240. The other input to comparator 240 is connected to the output from trailing zero logic detector circuit 252. Circuit 252 receives its input from the resultant root fraction register 250. If comparator 240 determines that the number of trailing zeros from circuit 230 are equal to the number of trailing zeros from circuit 252, the signal on output line 241 forces the sticky bit (S) position to a zero; if comparator 240 determines that the number of trailing zeros from circuit 230 are not equal to the number of trailing zeros from circuit 252, the signal on output line 241 forces the sticky bit (S) position to a "1."

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for determining the sticky bit value as the result of a floating point divide operation in a binary computer processor, comprising:

a) a first register means for holding the dividend fraction, and a second register means for holding the divisor fraction;

b) a first and second trailing zero detector circuit respectively connected to each of said first and second register means, including means for providing an output representing the number of trailing zeroes in said register means;

c) a subtractor circuit connected to said trailing zero detector circuits said subtracter circuit having an output representative of the difference between the number of trailing zeroes in said respective register means;

d) a comparator circuit having a first input connected to receive said subtractor circuit output, and having a second input;

e) a quotient fraction register means for storing the quotient resulting from a division calculation of said dividend fraction and said divisor fraction;

f) a third trailing zero detector circuit connected to said quotient fraction register, including means for providing an output representing the number of quotient fraction trailing zeroes; said output being connected to the second input of said comparator, said comparator having an output for producing a sticky bit "1" value when said first and second inputs are unequal and a sticky bit "0" value when said first and second inputs are equal.

2. The apparatus of claim 1, wherein said subtracter circuit further comprises an output representative of the difference between the number of trailing zeroes in said respective register means, modified by a constant value.

3. The apparatus of claim 1, wherein said comparator further comprises means for generating a first output signal when said number of trailing zeroes in said quotient register is equal to the difference of the number of trailing zeroes in said first and second register means, and means for generating a second output signal when said number of trailing zeroes in said quotient register is unequal to the difference of the number of trailing zeroes in said first and second register means.

4. The apparatus of claim 1, wherein the first and second register means further comprises a single operand register.

5. The apparatus of claim 4, wherein the subtracter circuit further comprises a divide-by-two circuit having means for right-shifting the trailing zero detection circuit output one bit position.

6. The apparatus of claim 5, further comprising a root fraction register having means for storing the square root value of the operand value stored in the operand register.

7. The apparatus of claim 6, further comprising a trailing zero detector circuit connected to said root fraction register, including means for providing an output comprising the number of trailing zeroes in said root fraction register.

8. The apparatus of claim 7, wherein said comparator further comprises an input connection to receive the number of trailing zeroes in said root fraction register, and further comprises means for generating a first output signal when said number of trailing zeroes in said root fraction register is equal to the right-shifted output from the divide-by-two circuit.

9. The apparatus of claim 8, wherein said comparator further comprises means for generating a second output signal when said number of trailing zeroes in said root fraction register is unequal to the right-shifted output from the divide-by-two circuit.

* * * * *